A. C. CORNELISON.
CALCULATING MACHINE.
APPLICATION FILED MAY 13, 1908.

927,452.

Patented July 6, 1909.
6 SHEETS—SHEET 1.

FIG. 1.

WITNESSES:

INVENTOR
A. C. Cornelison,
BY Franklin H. Hough,
Attorney

UNITED STATES PATENT OFFICE.

ALEXANDER C. CORNELISON, OF HIGHLAND FALLS, NEW YORK.

CALCULATING-MACHINE.

No. 927,452.　　　　Specification of Letters Patent.　　　Patented July 6, 1909.

Application filed May 13, 1908. Serial No. 432,697.

*To all whom it may concern:*

Be it known that I, ALEXANDER C. CORNELISON, a citizen of the United States, residing at Highland Falls, in the county of Orange and State of New York, have invented certain new and useful Improvements in Calculating-Machines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to new and useful improvements in calculating machines and the object in view is to produce an apparatus of this nature which will be simple in construction, efficient in operation and so arranged that various calculations in addition, subtraction, multiplication or division may be effectually and quickly made.

The invention comprises various details of construction, combinations and arrangements of parts which will be hereinafter fully described and then specifically defined in the appended claims.

I illustrate my invention in the accompanying drawings, in which:—

Figs. 2ª and 2ᵇ are detail sectional views. Fig. 3 is a vertical sectional view on line 3—3 of Fig. 1, also looking in the direction of the arrows opposite the ends of line 3—3. Fig. 3ª is a detailed view showing a movable slide and series of pawl guides actuated thereby. Fig. 4 is a longitudinal vertical section on line 4—4 of Fig. 1. Fig. 4ª is a detail view. Fig. 5ª is a detail sectional view on line 5—5 of Fig. 3. Fig. 12 is a sectional view through a shaft, showing in elevation one of the multiplier or quotient wheels, and Fig. 13 is a sectional view taken at right angles to the view shown in Fig. 12.

Reference now being had to the details of the drawings by characters of reference, 1 designates the casing of the lower portion of the apparatus and 2 the upper casing, which has a movement independent of the lower casing.

Figure 5:
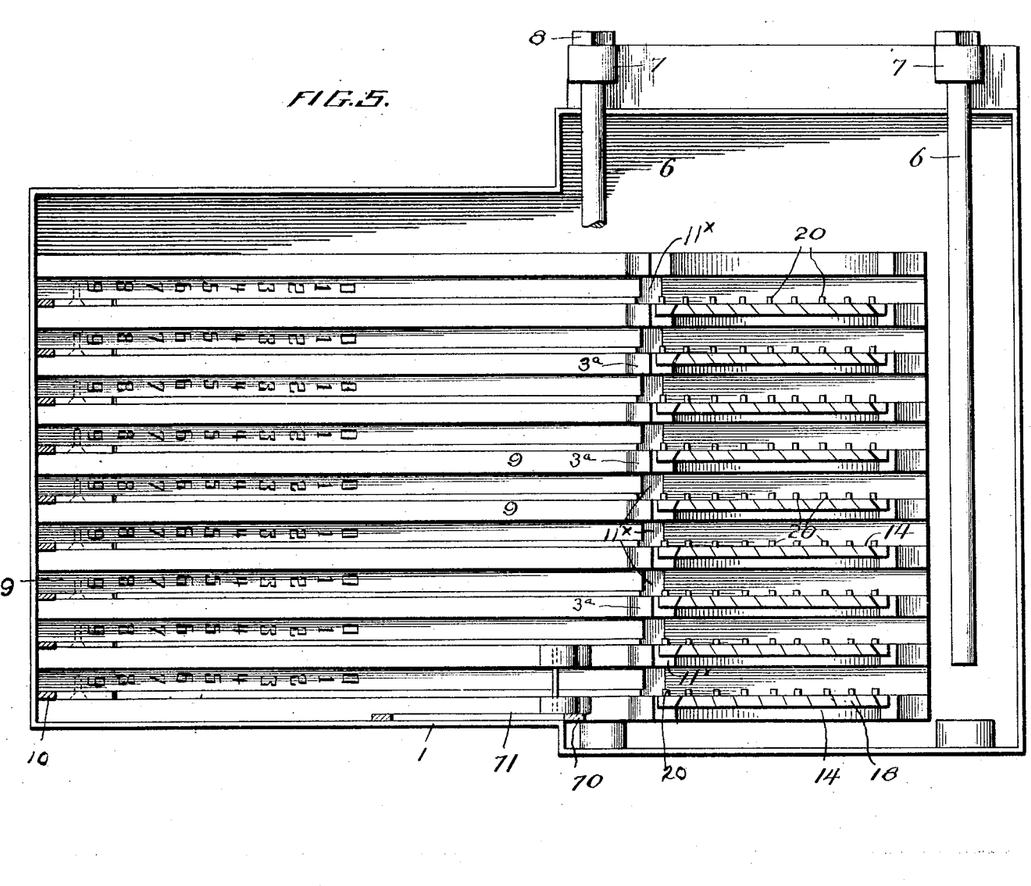
Fig. 5 is a transverse section on line 5—5 of Fig. 2.

3—3 designate standards having apertures in which the hollow shafts 5 slide, and 6—6 designate rods, shown clearly in Fig. 5 of the drawings, which extend through apertures in the standards 7 upon the left side of the frame of the apparatus and held in place by means of the nuts 8. Said standards 7 are fixed to the lower casing 1 which latter, for convenience, will be called the keyboard containing portion of the apparatus and is stationary, while the rods 6 telescope within the hollow shafts 5 which serve as guides for said rods 6. It will be noted that said rods each have an end passing through a standard 7 and a nut 8 mounted on the threaded end thereof, thereby securely holding the rod in place. The hollow shafts 5 have each a contracted end which is passed through the wall of the upper casing and a nut E is fitted to the threaded end of said hollow shaft. Said shaft 5 also passes through an opening in the standard 3 through which it has a free movement. The opposite or open end of each shaft 5 which passes through the opposite wall of the upper casing has a threaded portion E′ upon which are mounted two jam nuts, designated respectively by letters $E^2$ and $E^3$, one mounted upon each side of the wall of the upper casing. It will thus be noted that each shaft 6 is held stationary at corresponding ends while the hollow shafts move with the upper casing and telescope over said rods.

Figure 2:
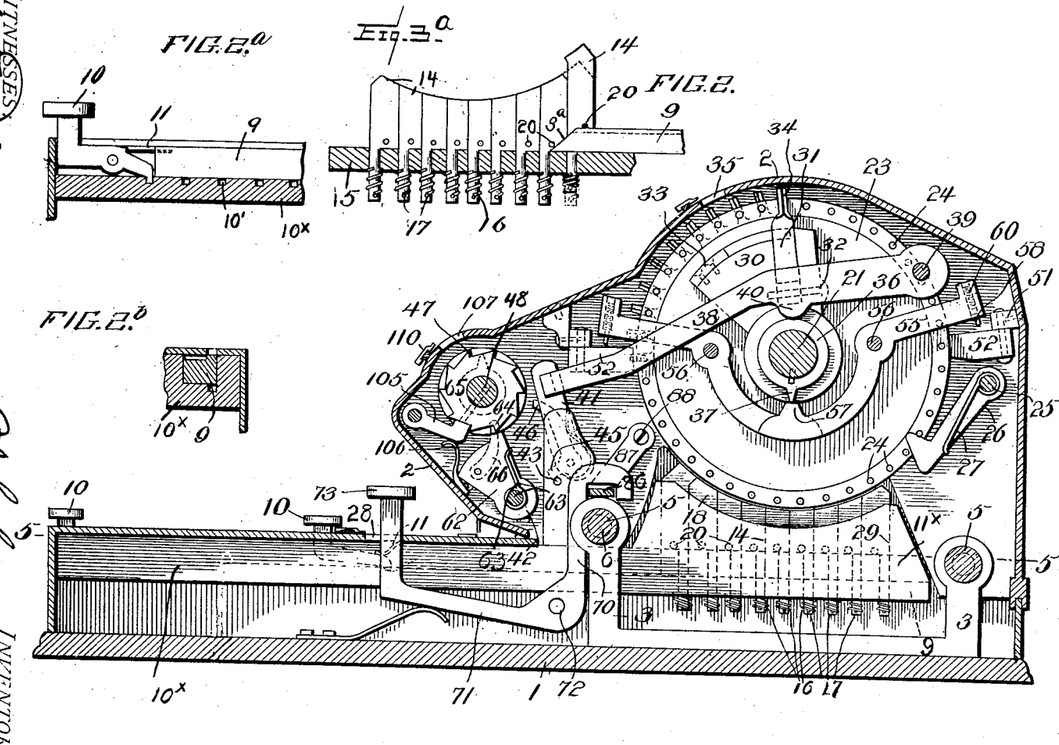
Fig. 2 is a vertical sectional view taken on line 2—2 of Fig. 1 looking in the direction of the arrow.

The casing 1 is provided with a series of longitudinally sliding bars 9, each of which has pivotally mounted upon its outer end a key 10 and a spring 11, shown in Fig. 2ª of the drawings, bears against each of said keys and tends to normally hold the end of the key in engagement with a groove 10' formed in plates 10ˣ within the casing 1. The inner end of each of said bars 9 is beveled, as shown at 3ᵃ in Fig. 5 of the drawings, and the inner throw of the bars is limited by the lengths of the slots in the casing 1 in which the keys 10 are mounted.

14—14 designate a series of pawl guides, each of which passes through an aperture in a plate 15 and a spring 16 is positioned about the portion of the pawl guide which projects through the aperture in the plate 15, said springs bearing between pins 17 and the under surface of the plate 15 and tending normally to hold the pawl guides at their lowest limit. The edges of said pawl guides are beveled, as designated in the drawings by numeral 18, and the various pawl guides are of different lengths, forming with their upper edges a concaved marginal line. Each of said pawl guides carries a pin 20 against which the beveled portions of the bars are adapted to contact as they are moved forward to throw the pawl guides in operative positions, as shown in Fig. 2 of the drawings.

Figures 4, 4A:
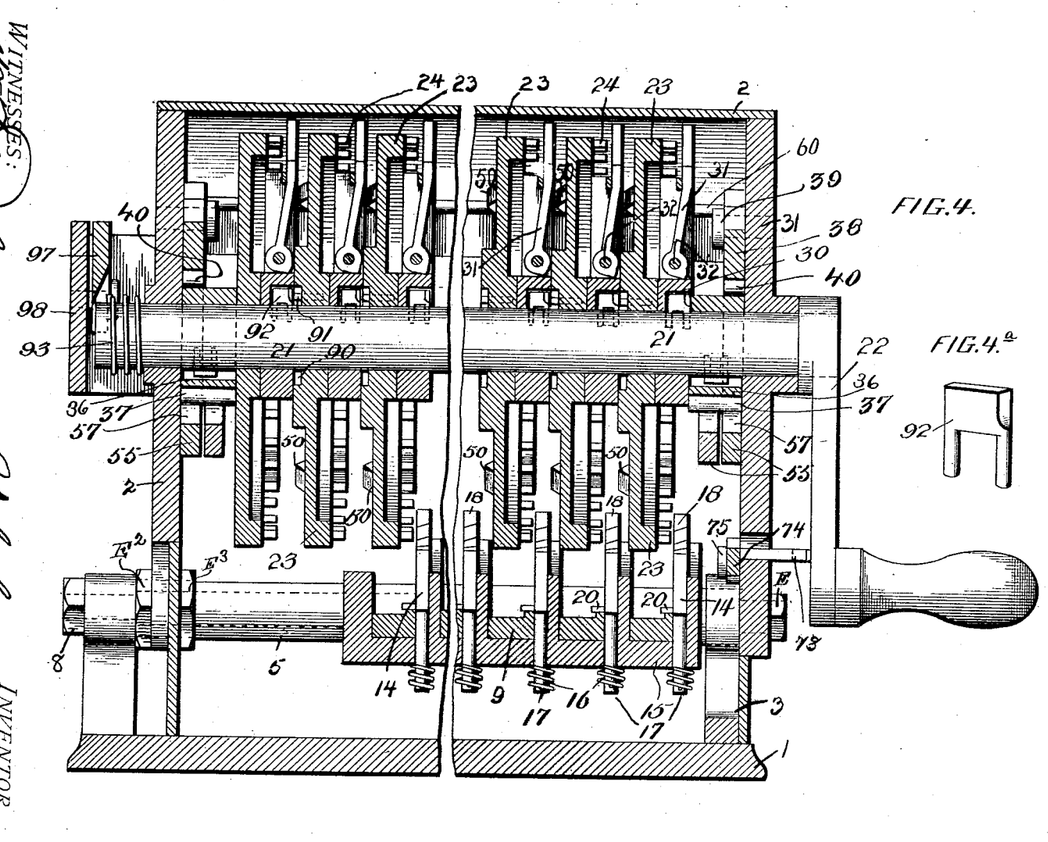

An operating shaft, designated by numeral 21, is journaled in the opposite side walls of the casing, as shown clearly in Fig. 4 of the drawings, and has a crank 22 fixed thereto. Loosely mounted upon said shaft 21 is a series of wheels, designated by numerals 23, each of which in the present instance is divided into forty equal spaces by pins 24 projecting from corresponding faces thereof adjacent to its periphery. A shaft 25, mounted in the opposite walls of the casing, carries a series of pawls 26, each of which is normally held by means of a spring 27 in the path of the pins 24, as shown clearly in Fig. 2 of the drawings, the purpose of said pawls being to normally hold the wheels 23 from rotation as the shaft 21 is operated by the crank handle, said wheels 23, however, being adapted to rotate upon the shaft by mechanism which will overcome the tension of the springs 27 and which mechanism will be presently described. The circumference of each of the wheels 23 is also divided into forty equal spaces, said spaces being numbered successively 0 to 9 four times, except the wheel farthest toward the left which is numbered 0 to 39 successively, thus causing the eleventh wheel to show two spaces, and it will be noted that the upper edge of each of the bars 9 has a series of numerals from 0 to 9 appearing thereon and visible through the apertures 108, as the bars are moved backward and forward, each numeral upon the bar 9 having a corresponding pawl guide 14.

Upon reference to Fig. 2 of the drawings, it will be noted that nine of the pawl guides have been raised to operative positions by the forward movement to its limit of one of the bars 9 and, in their operative positions, the upper ends of the pawl guides just clear the circumferences of the wheels 23 which will allow the upper casing to move back and forth without interference from said pawl guides. When the bar 9, which has raised the guides to their operative positions, is returned to its farthest outer limit, the springs bearing against said guides will return each to its normal position, as shown in Fig. 4. It will be noted upon reference to Fig. 4 of the drawings that said pawl guides are not positioned directly underneath the wheels 23 but rather to one side thereof.

Figures 6, 7, 8, 9, 10, 11, 14, 15, 16:
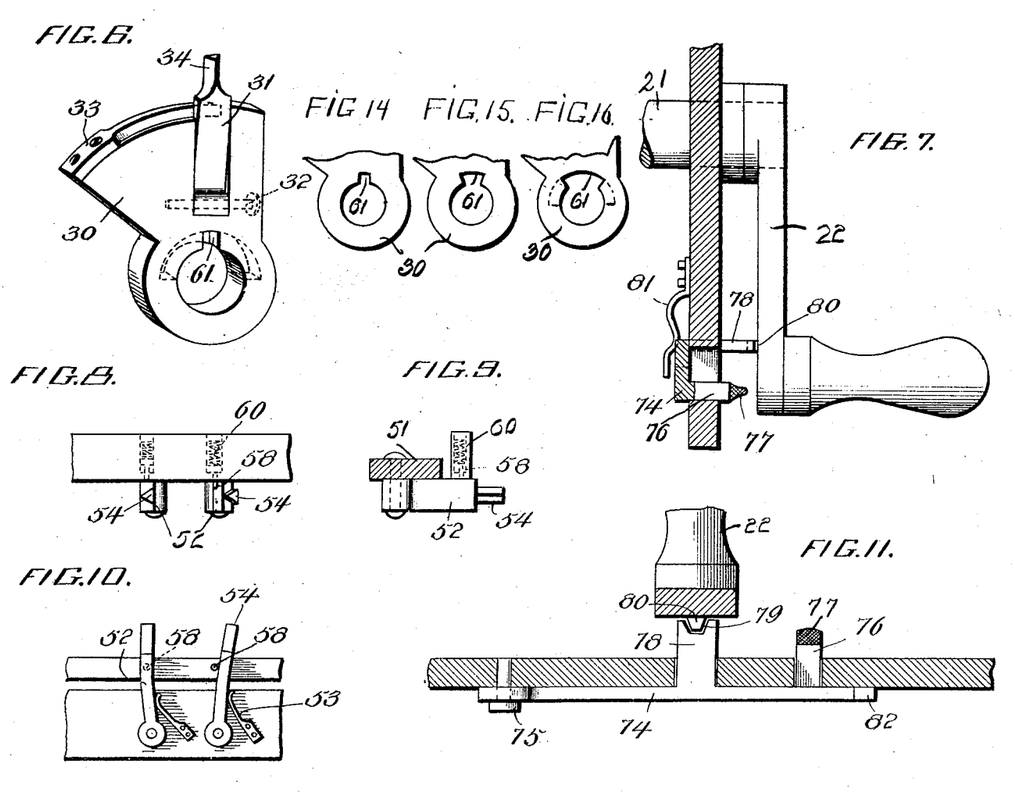
Fig. 6 is an enlarged detail perspective view of a segment mounted upon the main operating shaft and carrying a spring-pressed pawl.
Fig. 7 is a detail sectional view through the casing and means for locking the operating shaft.
Fig. 8 is a detail view showing means for locking of the pawl throwing member.
Fig. 9 is an edge view of the details shown in Fig. 8, partially in section.
Fig. 10 is a bottom plan view of the details shown in Figs. 8 and 9.
Fig. 11 is a sectional view through the casing and a portion of the handle fixed to the crank shaft and showing the locking means for holding the latter.
Figs. 14, 15 and 16 are detail views of parts of the invention.

Mounted upon the operating shaft 21 is a series of pawl carrying segments 30, one positioned to the right of each wheel 23. The first two pawl carrying segments to the right are keyed to the shaft upon which they are mounted in such manner as to cause them to rotate with said shaft without lost motion for the reason that nothing can be carried to the right or to the unit wheel, and each pawl carrying segment is provided with a pawl 31 pivotally mounted upon a pin 32, a detail of which is shown in Fig. 6 of the drawings, and upon the convexed end of each segment is fixed a spring 33 which normally holds the pawl 31 out of the paths of the pins 24 carried by the wheel 23. Each of the pawls 31 has a contracted portion 34 which is wedge shaped in cross section and is designed to contact with one or more of the beveled edges of the pawl guides 14 when raised to their operative positions as the shaft carrying said segments is rotated. As the shaft is rotated with the hands of a clock, the first segment to the right of the first or unit wheel 23, the beveled portion 34 of the pawl carried thereby will contact with the upper beveled edges of the pawl guides 14 and cause the pawl to tilt upon its pivot and be thrown against the tension of the spring 33 between two of the pins 24 upon the adjacent wheel 23, thus carrying the latter with the pawl segment until the pawl has passed the last one of the raised pawl guides, after which the spring 33 will return the pawl 34 to its normal position which is out of the paths of said pins 24. It will be noted that the pawl guides 14 are of such a width that each one will hold the pawl 31 in engagement with a pin 24 to rotate the wheel one space. The positive engagement of the pawl 31 with the pins of the wheel 23, as the shaft is rotated, will overcome the tension of the spring 27 which bears against the pawl 26 and move the wheel. After the pawl 31 has passed by the last of the pawl guides, a further rotary movement to the wheel 23 will be arrested by the pawl 26 which is normally thrown between the pins 24 by the spring 27. After the wheel 23 has been given a partial rotary movement, determined by the number of pawl guides which have been previously raised to operative positions, a numeral upon the circumference of the wheel 23 corresponding to the number of spaces which have been turned will appear at the sight aperture 35.

Upon reference to Fig. 2 of the drawings, it will be noted that a ring 36, which is keyed to the shaft 21, has a single cam tooth 37 thereon, there being two of said rings, one near each end of the shaft 21, and 38 designates an angled bail-shaped bar, the ends of which are pivotally mounted at 39 in the walls of the upper casing and each arm of the bail-shaped bar is provided with a cam 40 which is positioned in the path of the cam tooth 37 and provided for the purpose of causing the bail-shaped bar 38 to be raised each time the shaft 21 makes a complete revolution. The swinging bail portion of said bar 38 passes through a pawl carrier 41 which is free to slide upon said bar 38 as the upper casing 2 is shifted in one direction or the other. Said pawl carrier 41 is adapted to be guided in its vertical movements by the plates 42, which are spaced apart and which are fixed to the lower casing 1. A pin 43 is passed through apertures in the guide plates 42 and, when the pawl carrier 41 has been forced to its lowest position by the spring 44 which depresses the bar 38, a lug 45 upon the pawl 46 will engage the pin 43 and force the free end of the pawl 46 back and out of the path of the ratchet wheel 47, which is mounted upon the shaft 48 journaled in the walls of the casing 2. Whenever the shaft 21 is given a complete revolution, the cam 31 coming in contact with the cam 40 will cause the bail-shaped member 38 to be lifted and with it the pawl carrier 41 and, as the pawl 46 upon said carrier rises to a certain height clear of the pin 43, the spring bearing against said pawl will cause the same to be thrown forward into engagement with the teeth of the ratchet wheel 47 and, upon further upper movement, will cause an intermittent movement to be imparted to said wheel 47.

Figure 1:
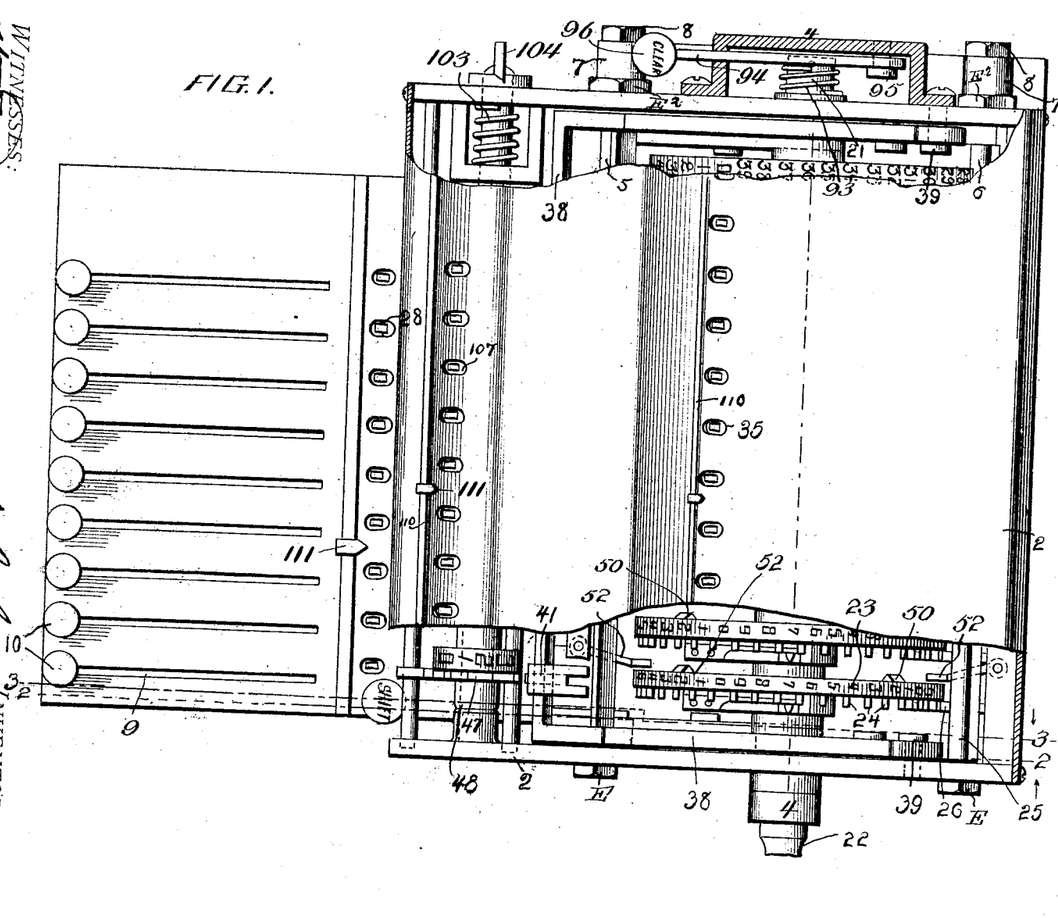
Figure 1 is a top plan view of my improved calculating machine, parts of the casing being broken away to better illustrate operative features of the apparatus.

It will be noted, upon reference to Fig. 1 of the drawings, that the circumference of a cylindrical portion of the ratchet wheel bears a series of numerals, these being from 0 to 9, and dividing the circumference of the wheel into as many equal spaces to indicate the number of revolutions which the shaft 21 makes.

The mechanism for carrying from one wheel 23 of a low denomination to one of a higher order to the left is as follows:—It will be noted, upon reference to Fig. 1 of the drawings, that beveled lugs, designated by numeral 50, project from the left face of each wheel 23, there being four of said lugs 50 arranged equi-distant, each being ten spaces apart, except the last wheel to the left which has only one for operating the error signal. Pivotally mounted upon the bars 51, an end view of one being shown in Fig. 2 of the drawings, are the pawl guides 52 and bearing against each of said pawl guides 52 is a spring 53, a detail of which is shown in Fig. 10 of the drawings. The end of each pawl guide 52 is beveled as at 54 upon one end thereof and said pawl guide 52 is normally held in the path of the beveled lugs 50 which project from the face of each wheel 23. As the wheel 23 is rotated and one of the lugs 50 comes in contact with the pawl 52, the latter is thrown to the left in the path of the rotating pawl 31 which is carried by the segment 30. After the pawl guide 52 has been thrown to the left by the lug 50, it is held in such position by means of the bars 55, there being two of these bars of similar construction and each mounted upon a pivot 56 carried by the walls of the casing of the apparatus, and each rod is bail-shaped and each bar has arms near the ends of the shaft 21, one of said arms upon each bar 55 being shown in Fig. 2 of the drawings. The free end of each of said bars 55 has a cam projection 57 which, when the apparatus is in its starting position, is normally underneath the cam tooth 37 and normally holds the bars in the position shown in Fig. 2 of the drawings, in which the pins 58 carried by the bar 55 are held above the pawl guides 52. A spring 59, shown in Fig. 3 of the drawings, bears yieldingly against each bar 55 and tends to cause the latter to tilt upon the pivots 56 when the shaft 21 rotates and the cam tooth 37 is released from the cam projection 57. Each of the pins 58 has a coiled spring 60 bearing against the same, as clearly shown in the detail views, Figs. 8 and 9, and, when the outer portions of the bars 55 are tilted down, said pins will be positioned against the edge of the pawl guide 52. The tension of the spring 59 is sufficient to cause the spring-pressed pin 58 to be thrown back into the aperture of the bar holding the same as the pin comes in contact with the upper edge of the pawl guide 52 but, when said pawl guide 52 is thrown laterally by a beveled cam 50 so that the pin will be free from the pawl guide 52, the spring 60 will throw the pin outward and down alongside the pawl guide 52 and will hold the pawl guide in a locked position in the path of the pawl 31. As the pawl comes in contact with the pawl guide 52, said pawl 31 will be thrown between the two of the pins projecting from the adjacent wheel 23 to the left and cause the latter to make a partial revolution. When all of the pawls 31 has passed all of the pawl guides 52 and 14 and shaft 21 comes to position of rest, the cam tooth 37 will come in contact with the cam projection 57 of the bar 55 and cause the latter to tilt, raising the pin 58 from contact with the pawl guide 52 and the spring which bears against the latter will return it to its normal position.

In order that all carrying from one wheel 23 to another may be correctly done, it is necessary that the pawls 31 of the lower order should have passed all pawl guides 52 and 14 at least one space in advance of the pawl 31 of the next higher order, that is from units, tens, hundreds, etc. This is accomplished by increasing the widths of the key slots in the pawl carriers 30 as the orders become higher. The pawls 31 which act upon the units and tens are always, no matter in which direction rotated, one space ahead of the pawls of the hundreds wheel when passing pawl guides and this in turn one space ahead of the pawl of the thousand wheel and so on. Upon reference to Fig. 6 of the drawings, it will be observed that the key way 61, outlined by full lines, represents the size of the segment carrying the pawl for operating upon the unit of ten wheel, there being no play intermediate said segment and the shaft upon which it is mounted, whereas the next adjacent pawl carrying segment will have a key way or slot three times the width of the one to the extreme right so that, when the pawl carrying segments are moved in either direction, each pawl will drop automatically behind the pawl of the next lower order. It will be observed that, by having the two complete sets of pawl guides 52 upon opposite sides of the wheels and two guide bars carrying spring-pressed pins, the machine may be worked with equal facility whether the operating shaft is rotated in one direction or the other.

By the provision of the segments with key slots of varying widths or analogous means, the various segments will fall one behind another as the order becomes higher from units up, no matter in which direction the shaft and pawls carried thereby are rotated and which constitutes an important feature of the present invention.

The carrying mechanism for the ratchet wheels 47 is shown clearly in Fig. 2 of the drawings and in which the segment 62 is shown as loosely mounted upon a shaft 63 and is held normally in the position shown in Fig. 2 by means of the spring 63 X. Said segment 62 has a single gear tooth 64 projecting therefrom which is positioned in the path of the single gear tooth 65 upon the wheel 47. Pivotally mounted upon the segment 62 is a spring-pressed pawl 66 which is adapted to engage the teeth of the ratchet wheel 47 of the next higher order. It will thus be noted that the tooth 65 of the wheel 47 actuates the tooth 64 of the segment 62 and carries the next wheel 47 one space around. When the tooth 65 has cleared the tooth 64, the segment 62 with the pawl 66 will return to their normal positions under the tension of the springs bearing against the same.

In order to hold the two casings 1 and 2 in locked relation with each other, one of the hollow bars 5 is provided with notches in which the upwardly extending portion 70 of the shifting lever 71 is adapted to be engaged, said lever 71 being pivotally mounted upon a rod 72 and is provided with a suitable key at its outer end. The operating shaft 21 is held in a locked position by means of the mechanism shown in the detailed views, Figs. 3, 7, and 11, in which a bar 74 is shown as being pivotally mounted upon a pin 75 and has a laterally projecting lug 75 thereon which projects through an aperture in the casing 2 and has a beveled milled surface 77 which is conveniently engaged by the finger of an operator taking hold of the handle of the crank shaft. Said bar 74 has a second laterally projecting lug 78 having a notched end 79 adapted to receive a lug 80 upon the crank handle in the manner shown clearly in Fig. 11 of the drawings. A spring 81 is fastened to the casing and bears yieldingly against the bar 74 and tends to normally hold the bar 74 in a locked relation with reference to the lug of the crank handle. When it is desired to rotate the shaft 21, the operator by pressing up upon the bar 74 may throw the lug 78 out of engagement with the lug 80 thereby allowing the shaft to be rotated in one direction or the other and the spring 81 will retain the bar 74 in this upper position with the lug 82 engaged in the slot 83 so that the shift key 73 cannot be depressed until the bar 74 is again depressed and the crank locked. Before, however, it will be possible for the bar 74 to be rocked upon its pivot to release the main operating shaft, it will be necessary that the upright portion 70 of the shifting lever be in engagement with one of the notches in the shaft 5 which holds the two casings in a locked relation. Said bar 74 has an upwardly projecting portion 82 at its free end, shown clearly in Figs. 3 and 11 of the drawings, and which projecting portion is adapted to engage a recess 83 formed in the segment plate 84 pivotally mounted at 85, which latter has a cross-piece 86 with its opposite end 87, shown in Fig. 2 of the drawings, pivotally mounted upon a screw 88 in the walls of the casing 2. The upper end of the shifting lever 71 is hook shape, as at 89, and engages over the cross-piece 86 and, as the shifting lever 71 is tilted back upon its pivot, said cross-piece with its segment 84 are moved so that the slot 83 will come in alinement with the upwardly projecting end 82, thus allowing said projection to enter the slot so that the bar 74 may be lifted upon its pivot and the operating shaft 21 rotated only when the lever 70 is engaged in the notch in the rod 5, thus locking the parts 1 and 2 in correct relation. When the upper casing 2 is shifted, the pawl carrier 41, which is held between the guide plates 42, slides on the horizontally disposed portion of the bar 38 and thus the pawl 46 will successively engage the various ratchet wheels 47.

The mechanism for clearing or bringing all of the wheels 23 to their original starting positions where only zeros will be displayed at the sight apertures 35 is illustrated in Figs. 1 and 4 of the drawings and in which, it will be noted, there is a recess 90 formed in the left faces of the wheels 23 and projecting into said recess is a stud 91. 92 is a key which is carried by the shaft 21 and fits loosely the slots in the pawl carrying segments 30 assembled on the shaft 21. The shaft 21 is adapted to have a slight longitudinal movement and is held in its normal position by means of a spring 93, shown clearly in Fig. 4 of the drawings. A clearing lever, designated by numeral 94, is shown in Fig. 1 of the drawings as being pivotally mounted upon a pin 95 and has a key 96 at its free end, while intermediate its ends it has a beveled portion 97, shown clearly in Fig. 4 of the drawings, which is adapted as the lever 94 is depressed to have a wedging action intermediate a strip 98 upon the side of the casing 2 at the end of the shaft 21. As the shaft 21 is moved to the right by the depression of the lever 94, the key 92 is moved partially out of the slot 61 and into the recess 90 formed in the hub of the wheel 23 adjacent thereto. When the shaft 21 is rotated by the crank handle 22, the key 92 will engage the stud 91 and rotate the wheels until they show zero at the sight aperture 35. When the key 94 is released, the spring 93 will return the shaft 21 to its normal position.

Figures 3, 5A, 12, 13:
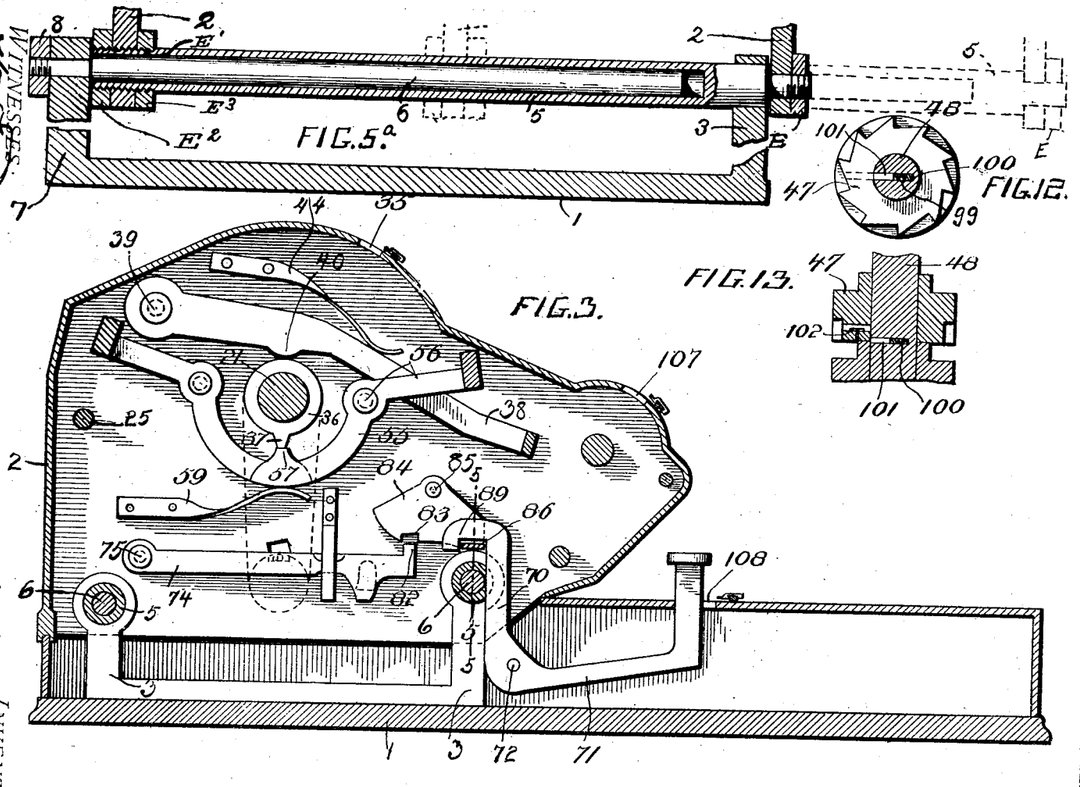

The mechanism for clearing the wheels 47 will be seen upon reference to Figs. 12 and 13 and in which the shaft 48 is provided with a transverse hole 99, in which a spring 100 is mounted and which is adapted to bear against a pin 101, the tendency of said spring being to cause the pin 101 to project out of said hole beyond the circumference of the shaft 48. A pin 102 is mounted in a hole in the ratchet tooth part of the wheel 47 and free to slide a short distance. The shaft 48 is normally held to one side of the casing by a spring 103, shown in Fig. 1 of the drawings, so that the holes in the ratchet wheel and the shaft 48 do not aline but, when the shaft 48 is forced out of its normal position by turning a nut 104, the holes in the shaft and ratchet wheel 23 will come into registration, after which by rotating the shaft the springs 100 will force the pins 101 outward into the holes in the ratchet wheel 47 and, at the same time, the pins 102 will be forced outward until their ends protrude beyond the circumference of the ratchet wheel. Thus locked to the shaft 48, the wheels 47 will rotate with the shaft 48 until the pins 101 come under the pawls 105, acted upon by the spring 106, shown clearly in Fig. 2 of the drawings. The pawls 105 will drive the pins 101 back flush with the surface of the ratchet wheel and unlock the ratchet wheels from the shaft 48. At this position all of the wheels 48 show zeros at the windows 107. Mounted adjacent to each of the sight apertures or windows 35, 107 and 108 are the slides 110 having pointers 111 thereon, as shown clearly in Fig. 1 of the drawings, and which are utilized to represent decimal points.

In order to demonstrate one of the features accomplished by my improved apparatus, we will suppose it is desired to multiply the numerals 42 by 16,900 and subtract 5,450 and divide the result by 52. The first step in accomplishing this is to depress the third, fourth and fifth keys 10 and push the levers carrying the same rearward until the numerals 16,900 show in the consecutive sight apertures 108, after which the crank shaft 21 is given two complete revolutions and the numeral 2 will appear in the unit or first window or sight aperture 107. This being done, the operator depresses the lever 71 which unlocks the latter from the shaft 5, which will allow the upper casing 2 to be moved independent of the lower casing which always remains stationary. The upper casing is moved one space to the right, after which the crank is rotated until the multiplier 4 appears at the window 107. This being accomplished, the product of 16,900 multiplied by 42, which will make a product of 709,800 will appear at the sight apertures or windows 35. The upper casing is then returned to its starting position and the keys 10 are depressed and the levers carrying the same moved forward so that the numerals 5,450 will appear at the sight apertures 108, after which the crank shaft is rotated once in the reverse order from the rotation of the shaft in making the other calculations and the numerals 704,350 will appear at the sight apertures of windows 35. The wheels which bear the numerals visible at the sight aperture 107 are then cleared by turning the nut 104 which is fixed to the shaft 48; and the numerals 52 are made to appear at the sight apertures 108 in the units and tens row by the manipulation of the keys 10 and the levers to which they are fastened. The upper casing is then shifted so that the unit place of the keyboard is under the fifth place of the upper part of the casing, then the crank shaft is rotated in a direction reverse to the movement of the hands of a clock one revolution and the hundred thousands place will show at the sight aperture 35 the numeral 1. As 1 is less than 5 (the left figure of the divisor), the upper case is shifted one space toward the left after which the crank is rotated until a figure less than 5 appears at the ten thousand place in the window 35. This is continued until the windows 35 display less than windows 108. In the present instance, numeral 10 will appear in windows 35 and windows 107 will now show 13,545 which is the quotient sought and 10, the numeral displayed at the windows 35, will be the remainder.

By the provision of a calculating apparatus as shown and described, it will be readily understood that the machine is equally well adapted for addition or multiplication which are the reverse of subtraction and division and that the apparatus is so arranged that the shaft may be turned in either direction and the numerals indicated at the proper sight apertures.

What I claim to be new is:—

1. A calculating machine having a stationary and a movable casing, a rotatable shaft mounted in the movable casing, loosely mounted numeral bearing wheels carried by said shaft and pawls rotating with the shaft, pawl guides mounted in the stationary casing, means for throwing said guides into the paths of the pawls, whereby, as the shaft is rotated, said wheels may be caused to rotate with the pawls.

2. A calculating machine having a stationary and a movable casing, a rotatable shaft mounted in the movable casing, loosely mounted numeral bearing wheels carried by said shaft and pawls rotating with the shaft, pawl guides mounted in the stationary casing, means for throwing said guides into the paths of the pawls, and pins projecting from corresponding faces of said wheels and adapted to be engaged by said pawls, as set forth.

3. A calculating machine having a stationary and a movable casing, a rotatable shaft mounted in the movable casing, loosely mounted numeral bearing wheels carried by said shaft and pawls rotating with the latter, spring-pressed pawl guides mounted upon the stationary casing, means for moving said guides into the paths of said pawls, and to cause the latter to engage and allow a rotary movement to be imparted to the numeral bearing wheels, as set forth.

4. A calculating machine having a stationary and a movable casing, a rotatable shaft mounted in the movable casing, loosely mounted numeral bearing wheels carried by said shaft and pawls rotating with the shaft, spring-pressed pawl guides mounted upon the stationary casing, movable bars for raising said guides into the paths of said pawls, and means carried by the wheels and engaged by said pawls for imparting a rotary movement to the numeral bearing wheels, as set forth.

5. A calculating machine having a stationary and a movable casing, a rotatable shaft mounted in the movable casing, loosely mounted numeral bearing wheels carried by said shaft and pawls rotating with the shaft, spring-pressed pawl guides mounted upon the stationary casing, movable bars for raising said guides into the paths of said pawls, projections upon corresponding faces of said wheels which are engaged by said pawls to cause a rotary movement to be imparted to the numeral carrying wheels, as set forth.

6. A calculating machine having a stationary and a movable casing, a rotatable shaft mounted in the movable casing, loosely mounted numeral bearing wheels carried by said shaft and pawls rotating with the shaft, spring-pressed pawl guides mounted upon the stationary casing, projections upon each of said guides, a movable bar adapted to engage said projections and raise the guides into the paths of said pawls, pins projecting from the wheels and engaged by said pawls whereby a rotary movement is imparted to the numeral bearing wheels, as set forth.

7. A calculating machine having a stationary and a movable casing, a rotatable shaft mounted in the movable casing, loosely mounted numeral bearing wheels carried by said shaft and pawls rotating with the shaft, spring-pressed pawl guides mounted upon the stationary casing, projections upon each of said guides, a movable bar having a beveled portion adapted to engage said projections upon the guides whereby the latter may be raised into the paths of said pawls, pins projecting from the wheels and engaged by said pawls whereby a rotary movement may be imparted to the numeral bearing wheels, as set forth.

8. A calculating machine having a stationary and a movable casing, a rotatable shaft mounted in the movable casing, loosely mounted numeral bearing wheels carried by said shaft and pawls rotating with the shaft, movable pawl guides mounted in the stationary casing and having beveled portions, the upper ends of said guides being concaved, movable bars for raising said guides into the paths of said pawls, and locking same in operative positions, and pins projecting from said wheels and engaged by said pawls whereby rotary movements may be imparted to the wheels, as set forth.

9. A calculating machine having a stationary and a movable casing, a rotatable shaft mounted in the movable casing, loosely mounted numeral bearing wheels carried by said shaft and pawls rotating with the shaft, movable pawl guides mounted in the stationary casing and having beveled portions, the upper ends of said guides being concaved, movable bars for raising said guides into the paths of said pawls, a key pivoted to each of said movable bars, a notched strip engaged by said key whereby the bars may be held in locked positions, and pins projecting from said wheels and engaged by said pawls, as set forth.

10. A calculating machine having a stationary and a movable casing, a rotatable shaft mounted in the movable casing, loosely mounted numeral bearing wheels carried by said shaft and pawls rotating with the shaft, movable pawl guides mounted in the stationary casing and having beveled portions, the upper ends of said guides being concaved, movable bars for raising said guides into the paths of said pawls, a key pivoted to each of said movable bars, a spring bearing against each key and adapted to normally hold the end thereof in engagement with a notch within the stationary casing, pins projecting from said wheels and adapted to be engaged by said pawls, whereby a rotary movement may be imparted to the wheels, as set forth.

11. A calculating machine having a stationary and a movable casing, a rotatable shaft mounted in the movable casing, loosely mounted numeral bearing wheels carried by said shaft and pawls rotating with the shaft, pawl guides having shank portions mounted in slots within the stationary casing, springs mounted upon the shank portions of said guides and adapted to normally hold the same at their lowest limits, a pin projecting from each guide, a series of movable bars each having a beveled portion, keys upon said bars adapted to move the same underneath said pins and cause the guides to be raised to operative positions in the paths of said pawls, pins projecting from the wheels and engaged by said pawls whereby rotary movements may be imparted to the numeral bearing wheels, as set forth.

12. A calculating machine having a stationary and a movable casing, means for locking the casings together, a shaft mounted in the movable casing, numeral bearing wheels loosely journaled upon said shaft, spring-pressed pawls rotating with the shaft, a series of pawl guides, means for moving the same into the paths of said pawls, pins projecting from said wheels and engaged by said pawls whereby rotary movements may be imparted to the wheels, as set forth.

13. A calculating machine having a stationary and a movable casing, means for locking the casings together, a shaft mounted in the movable casing, numeral bearing wheels loosely journaled upon said shaft, pivotal spring-pressed pawls rotating with the shaft, a series of pawl guides, means for moving the same into the paths of said pawls, pins projecting from said wheels and engaged by said pawls whereby rotary movements may be imparted to the wheels, as set forth.

14. A calculating machine having a stationary and a movable casing, means for locking the casings together, a shaft mounted in the movable casing, numeral bearing wheels loosely journaled upon said shaft, pivotal spring-pressed pawls rotating with the shaft, each of the latter having a beveled portion, a series of pawl guides, means for moving the same into the paths of said pawls, pins projecting from said wheels and engaged by said pawls whereby rotary movements may be imparted to the wheels, as set forth.

15. A calculating machine having a stationary and a movable casing, means for locking the casings together, a shaft mounted in the movable casing, numeral bearing wheels loosely journaled upon said shaft, pawl carrying segments fixed to rotate with said shaft, a movable pawl carried by each of said segments, pawl guides, means for moving the same into the paths of said pawls, and pins projecting from said wheels and engaged by said pawls whereby a rotary movement may be imparted to the numeral bearing wheels, as set forth.

16. A calculating machine having a stationary and a movable casing, means for locking the casings together, a shaft mounted in the movable casing, numeral bearing wheels loosely journaled upon said shaft, pawl carrying segments fixed to rotate with said shaft, a pivotal pawl mounted in a slot in each of said segments, a spring bearing between each pawl, pins projecting from the faces of said wheels, pawl guides mounted within the stationary casing, and means for moving the same into the paths of said pawls whereby the latter may be thrown into engagement with said pins as the shaft is rotated, as set forth.

17. A calculating machine having a stationary and a movable casing, means for locking the casings together, a shaft mounted in the movable casing, numeral bearing wheels loosely journaled upon said shaft, pawl carrying segments fixed to rotate with said shaft, a pivotal pawl mounted in a slot in each of said segments, a spring fixed to each segment and bearing against said pawl and adapted to normally hold the latter out of the paths of said pins, pawl guides mounted upon the stationary casing, means for moving the same into the paths of said pawls whereby, as the shaft is rotated, the pawls are thrown into engagement with the teeth of said wheels to cause the same to rotate, as set forth.

18. A calculating machine comprising a fixed and a movable casing, a shaft mounted upon said movable casing, numeral bearing wheels loosely mounted upon said shaft, pins projecting from said wheels, segment carrying pawls mounted upon said shaft and having loose key connections with the latter whereby the segments may have independent movements upon a movable pawl mounted upon each segment, pawl guides within the stationary casing, means for moving the same in the paths of said pawls whereby, as the shaft is rotated, the pawls may be thrown into engagement with said pins to cause the numeral bearing wheels to rotate with the shaft, as set forth.

19. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, and means carried by said wheels for moving the pivotal guides into the paths of said pawls, as set forth.

20. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, means carried by said wheels for moving the pivotal guides into the paths of said pawls, and mechanism for holding the pivotal guides in the paths of said pawls, as set forth.

21. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, a spring-pressed pawl carried by the movable casing and held yieldingly between said pins, a series of pawl guides, and means for moving the same into the paths of said pawls, as set forth.

22. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, lugs projecting from the faces of said wheels and in the paths of said guides and adapted to throw the guides into the paths of said pawls, as set forth.

23. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, lugs projecting from the faces of said wheels and in the paths of said guides and adapted to throw the guides into the paths of said pawls, and means for holding the guides in the paths of said pawls, as set forth.

24. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, lugs projecting from the faces of said wheels and in the paths of said guides and adapted to throw the guides into the paths of said pawls, a rocking member mounted in the movable casing, means carried thereby for engaging said guides and holding the same in the paths of said pawls, and mechanism for moving said member as the shaft is rotated, as set forth.

25. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, lugs projecting from the faces of said wheels and in the paths of said guides and adapted to throw the guides into the paths of said pawls, a rocking member mounted in the movable casing, spring-pressed pins carried by said member and designed to engage and hold said guides in the paths of said pawls as the shaft is rotated, as set forth.

26. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, lugs projecting from the faces of said wheels and in the paths of said guides and adapted to throw the guides into the paths of said pawls, a rocking member mounted in the movable casing, spring-pressed pins carried by said member, a cam rotating with said shaft and adapted to normally hold said spring-pressed pins out of the paths of said guides, and springs for throwing said member so that the pins mounted thereon will engage and hold the guides in the paths of the pawls, as set forth.

27. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, lugs projecting from the faces of said wheels and in the paths of said guides and adapted to throw the guides into the paths of said pawls, a rocking member mounted in the movable casing, spring-pressed pins carried by said member, rings keyed to said shaft and each having a cam tooth, the inner end of said member having a cam projection designed to be engaged by said cam tooth to normally hold the spring-pressed pin upon the member out of engagement with said guide, as set forth.

28. A calculating machine comprising a fixed and a movable casing, a rotatable shaft journaled in the movable casing, a series of numeral bearings wheels loosely mounted upon said shaft, pawl carrying segments fixed to rotate with said shaft, a pawl carried by each of said segments, pins projecting from said wheels, pivotal pawl guides mounted upon the movable casing, lugs projecting from the faces of said wheels and in the paths of said guides and adapted to throw the guides into the paths of said pawls, a bail-shaped member pivotally mounted within the movable casing, a spring-pressed pin carried by said member, one end of the member having a cam projection, a ring fixed to the shaft and having a cam designed to engage said cam projection when the shaft is at rest to normally hold the spring-pressed pin out of engagement with said guide, as set forth.

29. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, pivotal pawl guides mounted upon the movable casing, a spring bearing against each of said guides and adapted to hold the free end of each in the paths of said pins upon the numeral bearing wheels, bail-shaped rocking members, spring-pressed pins carried by said members, springs adapted to hold the outer portions of said members at their farthest downward throw, the ends of the arms of said members having each a cam projection, rings fixed to the shaft and each having a cam tooth adapted to contact with the cam projection upon the arm of one of said members to hold the outer portions of the members raised above said guides, as set forth.

30. A calculating machine comprising a fixed and a movable casing, a rotatable shaft journaled in the movable casing, a series of numeral bearing wheels loosely mounted upon said shaft, pawl carrying segments fixed to rotate with said shaft, a pawl carried by each of said segments, pins projecting from said wheels, spring-pressed pawl guides mounted upon the movable casing, the free end of each guide being wedge shaped in cross section and positioned in the paths of lugs upon one of said numeral bearing wheels, a rocking bail-shaped member mounted upon the movable casing and having a series of shouldered apertures therein, a shouldered pin seated in each of said apertures, a spring bearing against each pin and adapted to normally hold the same projecting through the end of the aperture in which it is mounted, a cam projection upon the arm of each of said bail-shaped members, rings fixed to the said shaft and each having a cam tooth adapted to contact with the cam projection upon said member, as set forth.

31. A calculating machine comprising a movable and a fixed casing, means for locking the two casings from having independent movements, a shaft mounted within the movable casing, numeral bearing wheels loosely journaled thereon, pins projecting from said wheels, pawl carrying segments rotating with the shaft, a movable pawl mounted upon each segment, a series of pawl guides mounted within the fixed casing, means for moving said guides into the paths of said pawls, and means for locking said shaft from rotation, as set forth.

32. A calculating machine comprising a fixed and a movable casing, a shaft journaled in said movable casing, a series of numeral bearing wheels loosely mounted upon said shaft, pawl carrying segments rotating with said shaft, means for causing said wheels to move with said segments, a second shaft carried by the movable casing, numeral bearing wheels upon said second shaft, and means for imparting an intermittent rotary movement to the latter as said segment carrying shaft makes a complete revolution, as set forth.

33. A calculating machine comprising a fixed and a movable casing, a shaft mounted in said movable casing, pawl carrying segments rotating with said shaft, means for causing said wheels to rotate with said segments, a swinging bar mounted within the movable casing, means for moving said bar as the shaft is rotated, a pawl carried by said bar, a second shaft, numeral bearing wheels upon the latter, a ratchet wheel mounted upon said second shaft and adapted to be engaged by the pawl upon said bar, as set forth.

34. A calculating machine comprising a fixed and a movable casing, a shaft mounted in said movable casing, pawl carrying segments rotating with said shaft, means for causing said wheels to rotate with said segments, a swinging bar mounted within the movable casing, means for moving said bar as the shaft is rotated, a pawl carried by said bar, a guide for said pawl, a second shaft mounted within the movable casing, numeral bearing wheels thereon, and a ratchet wheel upon said second shaft adapted to be engaged by said pawl, as set forth.

35. A calculating machine comprising a fixed and a movable casing, a shaft mounted in said movable casing, pawl carrying segments rotating with said shaft, means for causing said wheels to rotate with said segments, a swinging bar mounted within the movable casing, means for moving said bar as the shaft is rotated, a pawl carrier mounted upon said bar, a pawl upon said carrier, a second shaft within the moving casing, numeral bearing wheels thereon, a ratchet wheel upon said second shaft and adapted to be engaged by said pawl, and guides for the pawl carrier, as set forth.

36. A calculating machine comprising a fixed and a movable casing, a shaft mounted in said movable casing, pawl carrying segments rotating with said shaft, means for causing said wheels to rotate with said segments, a swinging bar mounted within said casing and having a cam projection thereon, means upon said shaft for engagement with said cam projection for causing the bar to swing at each revolution of the shaft, a pawl carried by said bar, a second shaft mounted within the movable casing and having numeral bearing wheels thereon, a ratchet wheel mounted upon said second shaft and adapted to be engaged by said pawl, as set forth.

37. A calculating machine comprising a fixed and a movable casing, a shaft mounted in said movable casing, pawl carrying segments rotating with said shaft, means for causing said wheels to rotate with said segments, a swinging bar mounted within said casing and having a cam projection thereon, a ring fixed to said shaft and having a cam tooth designed at each revolution of the shaft to contact with said cam projection upon the bar and cause the same to be raised, a pawl carried by said bar, a second shaft mounted within the movable casing and having numeral bearing wheels thereon, a ratchet wheel upon said second shaft adapted to be engaged by said pawl, and means for holding said ratchet wheel from rotation in one direction, as set forth.

38. A calculating machine comprising a fixed and a movable casing, a shaft mounted in said movable casing, pawl carrying segments rotating with said shaft, means for causing said wheels to rotate with said segments, a bail-shaped swinging bar mounted within the movable casing, means for causing said movable bar to swing at each revolution of said shaft, a pawl carrying member loosely mounted upon the swinging bail portion of said bar, a pawl carried by said member, a second shaft mounted within the movable casing, numeral bearing wheels thereon, a ratchet wheel upon said second shaft and engaged by said pawl, as set forth.

39. A calculating machine comprising a fixed and a movable casing, a shaft mounted in said movable casing, pawl carrying segments rotating with said shaft, means for causing said wheels to rotate with said segments, a bail-shaped swinging bar mounted within the movable casing, means for causing said movable bar to swing at each revolution of said shaft, a pawl carrying member loosely mounted upon the swinging bail portion of said bar, a pawl carried by said member, guide plates between which said pawl is mounted, a lug upon the latter, a pin mounted between said guide plates and against which said pawl is adapted to contact, a second shaft mounted within the movable casing and having a series of numeral bearing wheels thereon, a ratchet wheel mounted upon said segment shaft and adapted to be engaged by said pawl, as set forth.

40. A calculating machine comprising a fixed and a movable casing, a shaft mounted upon the movable casing, a series of numeral bearing wheels loosely journaled thereon, means for imparting a movement to said numeral bearing wheels, a second shaft mounted within the movable casing, numeral bearing wheels thereon, means for imparting an intermittent movement to one of the numeral bearing wheels upon said second shaft, and mechanism for transmitting intermittent rotary movements from one wheel to another upon said second shaft, as set forth.

41. A calculating apparatus comprising a fixed and a movable casing, a shaft mounted in the movable casing, a series of numeral bearing wheels upon said shaft, means for imparting a movement to said wheels, a second shaft mounted within said movable casing, a series of independently movable numeral bearing wheels thereon, a ratchet wheel upon said second shaft, means for imparting an intermittent movement to the latter as the first referred to shaft is rotated, a rocking pawl carrying member, a pivotal pawl upon said member, a lug movable with said second shaft and adapted to contact with the lug upon said member whereby a movement may be imparted to the next adjacent numeral bearing wheel upon said second shaft, as set forth.

42. A calculating apparatus comprising a fixed and a movable casing, a shaft mounted in the movable casing, a series of numeral bearing wheels upon said shaft, means for imparting a movement to said wheels, a second shaft mounted within said movable casing, a series of independently movable numeral bearing wheels thereon, ratchet wheels upon said second shaft, means for imparting an intermittent movement to the latter as the first referred to shaft is rotated, a spring-pressed pawl carrying member having a lug projecting from one end thereof, a pawl pivotally mounted upon said member, a lug rotating with the second shaft and adapted to contact with the lug of said member for imparting an intermittent movement from one of the numeral bearing wheels upon the second shaft to the next adjacent wheel thereon, as set forth.

43. A calculating machine comprising a fixed and a movable casing, a shaft mounted in the movable casing, a series of numeral bearing wheels loosely journaled thereon, means for causing the wheels to rotate with said shaft, a second shaft mounted within the casing, a series of numeral bearing wheels thereon, means for transmitting motion from the wheels upon one shaft to those upon the other, said second shaft having a spring-pressed pin mounted in a transverse aperture therein, a spring-pressed pin mounted in an aperture in each numeral wheel upon said second shaft, and means for imparting a longitudinal movement to the latter to bring said pins into alinement, whereby the second shaft and the pinion wheels may be locked to rotate together, as set forth.

44. A calculating machine comprising a fixed and a movable casing, a shaft mounted in the movable casing, a series of numeral bearing wheels loosely journaled thereon, means for causing the wheels to rotate with said shaft, a second shaft mounted within the casing, a series of numeral bearing wheels thereon, means for transmitting motion from the wheels upon one shaft to those upon the other, said second shaft having a spring-pressed pin mounted in a transverse aperture therein, a spring-pressed pin mounted in an aperture in each numeral wheel upon said second shaft, means for imparting a longitudinal movement to the latter to bring said pins into alinement, whereby the second shaft and the pinion wheels may be locked to rotate together, and means for unlocking said numeral bearing wheels after they have returned to their starting positions, as set forth.

45. A calculating machine comprising a fixed and a movable casing, a shaft mounted in the movable casing, a series of numeral bearing wheels loosely journaled thereon, means for causing the wheels to rotate with said shaft, a second shaft mounted within the casing, a series of numeral bearing wheels thereon, means for transmitting motion from the wheels upon one shaft to those upon the other, said second shaft having a spring-pressed pin mounted in a transverse aperture therein, a spring-pressed pin mounted in an aperture in each numeral wheel upon said second shaft, and a spring-pressed pawl mounted in the path of one of said pins adapted to move the same within the apertures in which they are mounted, as set forth.

46. A calculating machine comprising a fixed and a movable casing, a shaft mounted in the movable casing, a series of numeral bearing wheels loosely journaled thereon, means for causing the wheels to rotate with said shaft, a second shaft mounted within the casing, a series of numeral bearing wheels thereon, means for transmitting motion from the wheels upon one shaft to those upon the other, said second shaft having a spring-pressed pin mounted in a transverse aperture therein, a spring-pressed pin mounted in an aperture in each numeral wheel upon said second shaft, a button upon the ends of said second shaft for rotating the latter, and a spring adapted to return said second shaft to its starting position after having been given a longitudinal movement, as set forth.

47. A calculating machine comprising a movable and a fixed casing, a shaft mounted in said movable casing, a series of numeral bearing wheels loosely mounted thereon, the corresponding faces of said wheels being recessed, a lateral projection from the wall of each recess, said shaft having a longitudinal movement, and means carried by the latter for engagement with said projection whereby said wheels may be returned to their starting positions, as set forth.

48. A calculating machine comprising a movable and a fixed casing, a shaft mounted in said movable casing, a series of numeral bearing wheels loosely mounted thereon, the corresponding faces on said wheels being recessed, a lateral projection from the wall of each recess, pawl carrying segments, keys fixed to said shaft and adapted to engage recesses in the bore of each segment carrying member, said shaft adapted to have a longitudinal movement whereby said keys may be thrown into the paths of said projections upon the numeral bearing wheels, as set forth.

49. A calculating machine comprising a movable and a fixed casing, a shaft mounted in said movable casing, a series of numeral bearing wheels loosely mounted thereon, the corresponding faces of said wheels being recessed, a lateral projection from the wall of each recess, pawl carrying segments, keys fixed to said shaft and adapted to engage recesses in the bore of each segment carrying member, said shaft adapted to have a longitudinal movement whereby said keys may be thrown into the paths of said projections upon the numeral bearing wheels, and means for imparting a longitudinal movement to said shaft, as set forth.

50. A calculating machine comprising a movable and a fixed casing, a shaft mounted in said movable casing, a series of numeral bearing wheels loosely mounted thereon, the corresponding faces of said wheels being recessed, a lateral projection from the wall of each recess, pawl carrying segments, keys fixed to each shaft and adapted to engage recesses in the bore of each segment carrying member, said shaft adapted to have a longitudinal movement whereby said keys may be thrown into the paths of said projections upon the numeral bearing wheels, and a movable member adapted to engage the end of said shaft to impart a longitudinal movement thereto, as set forth.

51. A calculating machine comprising a movable and a fixed casing, a shaft mounted in said movable casing, a series of numeral bearing wheels loosely mounted thereon, the corresponding faces of said wheels being recessed, a lateral projection from the wall of each recess, pawl carrying segments, keys fixed to each shaft and adapted to engage recesses in the bore of each segment carrying member, said shaft adapted to have a longitudinal movement whereby said keys may be thrown into the paths of said projections upon the numeral bearing wheels, a movable member adapted to engage the end of said shaft to impart a longitudinal movement thereto, and a spring for returning said shaft to its normal position, as set forth.

52. A calculating machine comprising a movable and a fixed casing, a shaft mounted in said movable casing, a series of numeral bearing wheels loosely mounted thereon, the corresponding faces of said wheels being recessed, a lateral projection from the wall of each recess, pawl carrying segments, keys fixed to each shaft and adapted to engage recesses in the bore of each segment carrying member, said shaft adapted to have a longitudinal movement whereby said keys may be thrown into the paths of said projection upon the numeral bearing wheels, and a movable wedge shaped member adapted to engage said shaft to impart a longitudinal movement thereto, as set forth.

53. A calculating machine comprising a movable and a fixed casing, a shaft mounted in said movable casing, a series of numeral bearing wheels loosely mounted thereon, the corresponding faces of said wheels being recessed, a lateral projection from the wall of each recess, pawl carrying segments, keys fixed to each shaft and adapted to engage recesses in the bore of each segment carrying member, said shaft adapted to have a longitudinal movement, whereby said keys may be thrown into the path of said projection upon the numeral bearing wheels, and a pivotal lever mounted upon the casing and having a wedge shaped end adapted to engage said shaft to impart a longitudinal movement thereto, as set forth.

54. A calculating machine comprising a fixed and a movable casing, a shaft mounted in said movable casing, a series of numeral bearing wheels loosely mounted thereon, means for moving the wheels with said shaft, a crank fixed to said shaft, a spring-pressed catch adapted to engage said crank to lock the same from rotation, as set forth.

55. A calculating machine comprising a fixed and a movable casing, a shaft mounted in said movable casing, a series of numeral bearing wheels loosely mounted thereon, means for moving the wheels with said shaft, a crank fixed to said shaft, and a pivotal catch mounted upon the casing and adapted to hold said crank from rotation, as set forth.

56. A calculating machine comprising a fixed and a movable casing, a shaft mounted in said movable casing, a series of numeral bearing wheels loosely mounted thereon, means for moving the wheels with said shaft, a crank fixed to said shaft, a spring-pressed catch lever pivotally mounted upon the casing and having a finger projecting laterally from the casing and notched, a lug upon said handle and adapted to be engaged by said notched finger, and means for moving said catch lever out of the path of said lug, as set forth.

57. A calculating machine comprising a fixed and a movable casing, a shaft mounted in said movable casing, a series of numeral bearing wheels loosely mounted thereon, means for moving the wheels with said shaft, a crank fixed to said shaft, a spring-pressed catch lever pivotally mounted upon the casing and having a finger projecting laterally from the casing and notched, a lug upon said handle and adapted to be engaged by said notched finger, a second projection upon said catch lever extending through an aperture in the casing and affording means whereby said lever may be moved out of the path of the lug upon the handle, as set forth.

58. In combination, in a calculating apparatus, a fixed and a movable casing, a shaft journaled in said movable casing, numeral bearing wheels loosely mounted thereon, means for causing said wheels and shaft to be moved together, a crank handle fixed to said handle, a pivotal shifting lever mounted in the fixed casing, a cross bar having a segment end at right angles thereto which is notched and pivoted to the casing, said shifting lever having an angled portion engaging over said cross bar adapted to hold the two casings from having independent movements, a catch lever mounted within the casing and having a projection designed to seat in the slot in said segment of the cross bar and also engage and lock said handle.

59. A calculating machine having a fixed and a movable casing, standards within the fixed casing, hollow shafts mounted in said standards, notches in said shafts, rods carried by the movable casing and telescoping within said hollow shaft, notches in said shafts engaged by said shifting levers whereby the two casings may be locked together, as set forth.

60. A calculating machine having a stationary and a movable casing, a rotatable shaft mounted in the movable casing, loosely mounted numeral bearing wheels of different orders upon said shaft, segments mounted to rotate with said shaft and representing different orders of numerals, mechanism so arranged that the various pawls in order will fall one behind another as the order increases as the shaft is rotated in one direction or the other, pawls carried by said segments, and means actuated by the pawls for imparting a rotary movement to the numeral bearing wheels, as set forth.

61. A calculating machine having a stationary and a movable casing, a rotatable shaft mounted in the movable casing, loosely mounted numeral bearing wheels of different orders upon said shaft, segments mounted to rotate with said shaft and representing different orders of numerals, mechanism so arranged that the various pawls in order will fall one behind another as the order increases as the shaft is rotated in one direction or the other, pivotal spring-pressed pawls mounted upon said segments, projections upon the wheels engaged by said pawls to rotate the wheels, and means for throwing the pawls into the path of said projections, as set forth.

In testimony whereof I hereunto affix my signature in the presence of two witnesses.

ALEXANDER C. CORNELISON.

Witnesses:
GEORGE W. COOKE,
CHAS. D. LYON.